US009516462B2

United States Patent
Yuk et al.

(10) Patent No.: US 9,516,462 B2
(45) Date of Patent: Dec. 6, 2016

(54) LOCATION UPDATE METHOD FOR TERMINAL SUPPORTING MULTIPLE RADIO ACCESS TECHNOLOGIES

(71) Applicant: LG ELECTRONICS INC., Seoul (KR)

(72) Inventors: Youngsoo Yuk, Anyang-si (KR); Jaehoon Chung, Anyang-si (KR); Eunjong Lee, Anyang-si (KR); Heejeong Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/409,908

(22) PCT Filed: Jun. 19, 2013

(86) PCT No.: PCT/KR2013/005396
§ 371 (c)(1),
(2) Date: Dec. 19, 2014

(87) PCT Pub. No.: WO2013/191461
PCT Pub. Date: Dec. 27, 2013

(65) Prior Publication Data
US 2015/0189468 A1 Jul. 2, 2015

Related U.S. Application Data

(60) Provisional application No. 61/661,353, filed on Jun. 19, 2012.

(51) Int. Cl.
*H04W 36/00* (2009.01)
*H04W 4/02* (2009.01)
(Continued)

(52) U.S. Cl.
CPC ............. *H04W 4/02* (2013.01); *H04W 36/14* (2013.01); *H04W 60/005* (2013.01);
(Continued)

(58) Field of Classification Search
CPC ... H04W 36/14; H04W 4/02; H04W 60/005; H04W 76/022; H04W 76/06; H04W 8/08
USPC ...... 455/456.1, 436, 422.1, 403, 418, 67.11; 370/331, 338, 395.5
See application file for complete search history.

(56) References Cited

U.S. PATENT DOCUMENTS 6,414,939 B1 * 7/2002 Yamato .............. H04Q 11/0478
370/236.1
7,986,915 B1 * 7/2011 Wang .................... H04B 7/155
455/7

(Continued)

FOREIGN PATENT DOCUMENTS

CN  WO 2011/144169 A1 * 11/2011 ............. H04L 12/56
KR  10-2011-0023906       3/2011

(Continued)

OTHER PUBLICATIONS

European Patent Application No. 13806553.7, European Search Report dated Mar. 1, 2016, 6 pages.

(Continued)

*Primary Examiner* — Joseph Arevalo
(74) *Attorney, Agent, or Firm* — Lee, Hong, Degerman, Kang & Waimey (57) ABSTRACT

A location update method for a terminal which supports multiple radio access technologies, according to the present invention, comprises the steps of: a terminal releasing the connection to wireless resources of the base station of a first network, which is able to access different networks simultaneously by using a first and a second radio access technology, in order to maintain an access only to the base station of a second network which uses the second radio access technology; establishing a layer 3 tunnel (L3 tunnel) to a virtual base station of the first network while maintaining an access only to the base station of the second network; and transmitting the location update of the terminal to the virtual base station of the first network to which the L3 tunnel has been established.

6 Claims, 5 Drawing Sheets

(51) Int. Cl.
    *H04W 36/14*     (2009.01)
    *H04W 76/06*     (2009.01)
    *H04W 60/00*     (2009.01)
    *H04W 68/02*     (2009.01)
    *H04W 76/02*     (2009.01)
    *H04W 88/06*     (2009.01)

(52) U.S. Cl.
    CPC ............ *H04W 68/02* (2013.01); *H04W 76/06* (2013.01); *H04W 76/064* (2013.01); *H04W 76/022* (2013.01); *H04W 76/026* (2013.01); *H04W 88/06* (2013.01)

(56) References Cited

U.S. PATENT DOCUMENTS

| | | | | | |
|---|---|---|---|---|---|
| 8,891,441 | B2* | 11/2014 | Gupta | .................... | H04W 36/14 370/328 |
| 9,331,899 | B2* | 5/2016 | Christopher | ............ | H04L 41/08 |
| 2001/0018346 | A1* | 8/2001 | Okajima | ................ | H04B 7/022 455/437 |
| 2002/0080800 | A1* | 6/2002 | Lee | .................... | H04L 12/4641 370/395.54 |
| 2003/0012151 | A1* | 1/2003 | Vassilovski | ....... | H04L 29/12018 370/312 |
| 2007/0002867 | A1* | 1/2007 | Shitano | ............... | H04L 12/2803 370/395.5 |
| 2007/0081530 | A1* | 4/2007 | Nomura | ................ | H04L 12/185 370/389 |
| 2007/0271598 | A1* | 11/2007 | Chen | .................... | H04W 12/06 726/4 |
| 2010/0054207 | A1* | 3/2010 | Gupta | .................... | H04W 36/14 370/331 |
| 2010/0088751 | A1* | 4/2010 | Ando | .................... | H04W 8/065 726/5 |
| 2010/0202361 | A1* | 8/2010 | Rahman | .............. | H04L 63/0272 370/328 |
| 2010/0290398 | A1* | 11/2010 | Choudhary | ........... | H04L 12/465 370/328 |
| 2011/0176488 | A1* | 7/2011 | Liebsch | ............ | H04L 29/12311 370/328 |
| 2011/0231654 | A1* | 9/2011 | Somadder | ........... | H04L 12/5691 713/153 |
| 2013/0103836 | A1* | 4/2013 | Baniqued | ............ | H04L 41/0803 709/226 |
| 2013/0259060 | A1* | 10/2013 | Liu | ..................... | H04L 12/4633 370/401 |
| 2013/0308565 | A1* | 11/2013 | Riegel | ............... | H04W 72/0413 370/329 |
| 2015/0063166 | A1* | 3/2015 | Sif | ...................... | G06F 9/45558 370/254 |
| 2015/0071251 | A1* | 3/2015 | Gupta | ............... | H04W 36/0011 370/331 |

FOREIGN PATENT DOCUMENTS

| | | |
|---|---|---|
| KR | 10-2012-0041144 | 4/2012 |
| WO | 2011/008578 A1 | 1/2011 |
| WO | 2011/123527 | 10/2011 |
| WO | 2011/152683 | 12/2011 |

OTHER PUBLICATIONS

ZTE, "Discussion on Wi-Fi access as a multi-RAT support in mobile relay architectures," 3GPP TSG-RAN WG3 #76, R3-121173, May 2012, 2 pages.

PCT International Application No. PCT/KR2013/005396, Written Opinion of the International Searching Authority dated Sep. 4, 2013, 18 pages.

* cited by examiner

LOCATION UPDATE METHOD FOR TERMINAL SUPPORTING MULTIPLE RADIO ACCESS TECHNOLOGIES

CROSS-REFERENCE TO RELATED APPLICATIONS

This application is the National Stage filing under 35 U.S.C. 371 of International Application No. PCT/KR2013/005396, filed on Jun. 19, 2013, which claims the benefit of U.S. Provisional Application Ser. No. 61/661,353, filed on Jun. 19, 2012, the contents of which are hereby incorporated by reference herein in their entirety.

TECHNICAL FIELD

The present invention relates to radio communication, and more specifically, relates to a method for updating a location when a user equipment (UE) capable of simultaneously accessing different networks maintains access only to a base station of a particular network.

BACKGROUND ART

In general, a link between existing multiples radio access technologies (RATs) or multiple systems (for example, long term evolution (LTE) and Wi-Fi systems) have focused on supporting mobility in terms of access to a network and authentication. However, there has recently been a discussion about receiving a service of general Internet data through a public network using Wi-Fi and receiving a support of a quality of service (QoS) or a service of a radio operator through an LTE core network in terms of managing networks of mobile carriers.

In this regard, there is a need for a concept of a state of a UE capable of integrating both the Wi-Fi and LTE networks. However, an existing technology fails to suggest a performance scheme through location management when the UE is connected only to the Wi-Fi network and a scheme of controlling an idle mode of the LTE network of a UE.

Moreover, there has been no research into a scheme for receiving a paging message of the LTE system when the UE is connected only to the Wi-Fi network and a location update scheme therefor.

DISCLOSURE

Technical Problem

An object of the present invention devised to solve the problem lies in a method of updating a location by a UE that supports a plurality of radio access technologies.

Another object of the present invention is to provide a UE that supports a plurality of radio access technologies and updates a location.

The technical objects that can be achieved through the present invention are not limited to what has been particularly described hereinabove and other technical objects not described herein will be more clearly understood by persons skilled in the art from the following detailed description.

Technical Solution

The object of the present invention can be achieved by providing a method for updating a location by a user equipment (UE) supporting a plurality of radio access technologies, the method including releasing a radio resource connection with a base station of a first network to maintain access only to a base station of a second network using a second radio access technology, the UE being capable of simultaneously accessing different networks using a first radio access technology and the second radio access technology, establishing a layer 3 (L3) tunnel with a virtual base station of the first network while maintaining access only to the base station of the second network, and transmitting an updated location of the UE to the virtual base station of the first network to which the L3 tunnel is established. The method may further include receiving a paging message from the virtual base station of the first network, and establishing a radio resource connection with the virtual base station of the first network according to the paging message. The method further may further include acquiring an Internet protocol (IP) address of the virtual base station of the first network, wherein an IP address of the virtual base station of the first network to which the L3 tunnel is established is the acquired IP address of the virtual base station of the first network. The method may further include receiving, a message for handover request to perform a handover the base station of the second network, from the virtual base station of the first network in a case in which the base station of the second network is needed to perform the handover due to movement of the UE, and performing the handover according to the handover request, and establishing the L3 tunnel with another virtual base station of the first network. The case in which the base station of the second network is needed to perform the handover corresponds to a case in which the UE is located in another bases station of the second network establishing a tunnel to another virtual base station of the first network due to movement of the UE. The first network may include a long term evolution (LTE) network, and the second network may include a Wi-Fi network.

In another aspect of the present invention, provided herein is a user equipment (UE) of updating a location, the UE supports a plurality of radio access technologies and updating a location, including a processor configured to release connection to radio resources of a base station of a first network to maintain access only to a base station of a second network using the second radio access technology, the UE being capable of simultaneously accessing different networks using a first radio access technology and a second radio access technology; and establishes an L3 tunnel with a virtual base station of the first network while maintaining access only to the base station of the second network, and a transmitter configured to transmit an updated location of the UE to the virtual base station of the first network to which the L3 tunnel is established.

Advantageous Effects

According to a variety of examples of the present invention, it is possible to efficiently control an idle mode through location management and update a location when a UE is connected only to a Wi-Fi network.

It will be appreciated by persons skilled in the art that that the effects that can be achieved through the present invention are not limited to what has been particularly described hereinabove and other advantages of the present invention will be more clearly understood from the detailed description below.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given on the assumption of a 3GPP LTE or LTE-A system, but the present invention is applicable to another arbitrary mobile communication system except for specific points of the 3GPP LTE or LTE-A system.

In several cases, publicized structures and apparatuses may be omitted or illustrated in a block diagram form centered on core functions of the respective structures and apparatuses in order to prevent a concept of the present invention from being ambiguous. In addition, the same component is described using the same reference numeral throughout the specification.

In addition, it is presumed that a UE commonly refers to a mobile or stationary device at a user end such as a terminal, a mobile station (MS), an advanced mobile station (AMS), or the like in description below. Moreover, it is presumed that a base station commonly refers to an arbitrary node at a network end which communicates with the terminal such as Node B, eNode B, Base station, an access point (AP), or the like. Although description is made based on an IEEE 802.16 system in this specification, description of the present invention is applicable to various other communication systems.

In a mobile communication system, the UE may receive information through downlink from the base station, and transmit information through uplink. The information transmitted or received by the UE includes data and a variety of control information. In addition, various physical channels are present based on a type and a use of the information transmitted or received by the UE.

Description below may be used for various radio access systems such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be implemented by a radio technology such as Universal Terrestrial Radio Access (UTRA) or CDMA2000. TDMA may be implemented by a radio technology such as Global System for Mobile communications (GSM)/General Packet Radio Service (GPRS)/Enhanced Data Rates for GSM Evolution (EDGE). OFDMA may be implemented by a radio technology such as IEEE 802.11 (Wi-Fi), IEEE 802.16 (WiMAX), IEEE 802-20, E-UTRA (Evolved UTRA), or the like. UTRA is a part of Universal Mobile Telecommunications System (UMTS). 3rd Generation Partnership Project (3GPP) LTE is a part of Evolved UMTS (E-UMTS) using E-UTRA, and adopts OFDMA in downlink and SC-FDMA in uplink. LTE-advance (LTE-A) is an evolution from 3GPP LTE.

In addition, specific terms used in the description below are provided to aid in understanding of the present invention. Use of specific terms may be changed to another form without departing from the technical spirit of the present invention.

Figure 1:
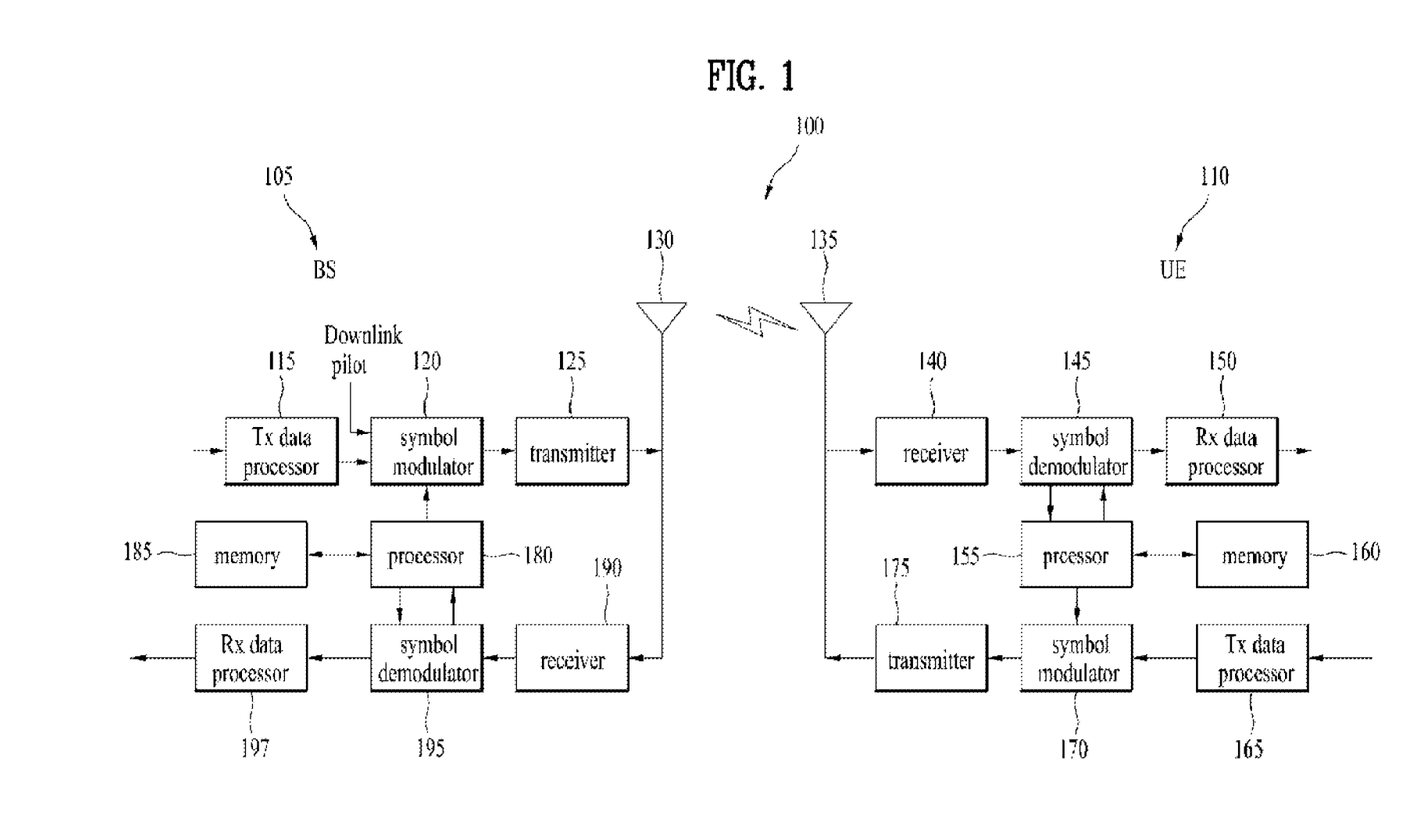
FIG. 1 is a block diagram schematically showing a configuration of a user equipment (UE) according to the present invention.

FIG. 1 is a block diagram illustrating a structure of a base station (BS) 105 and a user equipment (UE) 110 in a wireless communication system 100.

Although one BS 105 and one UE 110 (including a D2D UE) are illustrated in order to simply illustrating the wireless communication system 100, the wireless communication system 100 may include one or more BSs and/or one or more UEs.

Referring to FIG. 1, the BS 105 may include a transmission (Tx) data processor 115, a symbol modulator 120, a transmitter 125, a Tx/Rx antenna 130, a processor 180, a memory 185, a receiver 190, a symbol demodulator 195, and a reception (Rx) data processor 197. In addition, the UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. Although FIG. 1 illustrates that each of the BS 105 and the UE 110 includes the Tx/Rx antennas 130 and 135, respectively, each the BS 105 and the UE 110 includes a plurality of Tx/Rx antennas. Accordingly, the BS 105 and the UE 110 according to the present invention support a multiple input multiple output (MIMO) system. In addition, the BS 105 according to the present invention may support both single user-MIMO (SU-MIMO) and multi user-MIMO (MU-MIMO) schemes.

In the BS 105, one transceiver may be replace transmitter 125 and receiver 190, likewise, in the UE 110, one transceiver may be replace transmitter 175 and receiver 140.

In downlink, the Tx data processor 115 receives traffic data, formats and codes the received traffic data, and interleaves and modulates (or symbol-maps) the coded traffic data to provide modulated symbols ("data symbols"). The symbol modulator 120 receives and processes the data symbols and pilot symbols to provide a stream of symbols.

The symbol modulator 120 multiplexes the data and pilot symbols and transmits the multiplexed data and pilot symbols to the transmitter 125. In this case, each transmitted symbol may be a data symbol, a pilot symbol, or a zero signal value. In each symbol period, pilot symbols may be consecutively transmitted. The pilot symbols may each be a frequency division multiplexing (FDM) symbol, an orthogonal frequency division multiplexing (OFDM) symbol, a time division multiplexing (TDM) symbol, or a code division multiplexing (CDM) symbol.

The transmitter 125 receives the stream of symbols, converts the stream into one or more analog signals, and further adjusts (e.g., amplifies, filters, and frequency-upconverts) the analog signals to generate a downlink signal appropriate for transmission via a radio channel. Then the Tx antenna 130 transmits the generated downlink signal to the UE 110.

In the structure of the UE 110, the Rx antenna 135 receives the downlink signal from the BS 105 and provides the received signal to the receiver 140. The receiver 140 adjusts (e.g., filters, amplifies, and frequency-downconverts) the received signal and digitizes the adjusted signal to acquire samples. The symbol demodulator 145 demodulates the received pilot symbols and provides the pilot symbols to the processor 155 for channel estimation.

In addition, the symbol demodulator 145 receives a frequency response estimated value for downlink from the processor 155, data-demodulates the received data symbols to acquires data symbol estimated values (which is estimated values of the transmitted data symbols), and provides the data symbol estimated values to the Rx data processor 150. The Rx data processor 150 demodulates (i.e., symbol-demaps), deinterleaves, and decodes the data symbol estimated values to recover the transmitted traffic data.

Processing operations by the symbol demodulator 145 and the Rx data processor 150 are complementary to processing operations of the symbol modulator 120 and the Tx data processor 115 in the BS 105, respectively.

In uplink, the Tx data processor 165 of the UE 110 processes traffic data to provide data symbols. The symbol modulator 170 may receive and modulate the data symbols and provide a stream of the symbols to the transmitter 175. The transmitter 175 receives and processes the stream of symbols to generate an uplink signal. In addition, the Rx antenna 135 transmits the generate uplink signal to the BS 105.

In the BS 105, an uplink signal from the UE 110 is received by the Rx antenna 130, and the receiver 190 processes the received uplink signal to acquire samples. Then the symbol demodulator 195 processes the samples to provide pilot symbols and data symbol estimated values which are received for downlink. The reception (Rx) data processor 197 processes the data symbol estimated values to recover the traffic data transmitted from the UE 110.

The processors 155 and 180 of the UE 110 and the BS 105 order (e.g., controls, manipulates, manages, etc.) operations of the UE 110 and the BS 105, respectively. The processors 155 and 180 may be respectively connected to the memories 160 and 185 which store program codes and data. The memories 160 and 185 are respectively connected to the processors 155 and 180 and store an operating system, application, and general files.

The processors 155 and 180 may be referred to as a controller, a microcontroller, a microprocessor, a microcomputer, or the like. The processors 155 and 180 may each be embodied by hardware, firmware, software, or a combination thereof. When an embodiment of the present invention is embodied by hardware, the processors 155 and 180 may include application specific integrated circuits (ASICs), digital signal processors (DSPs), digital signal processing devices (DSPDs), programmable logic devices (PLDs), field programmable gate arrays (FPGAs), or the like which is configured to execute the present invention.

When an embodiment of the present invention is embodied by firmware or software, firmware or software may be configured in the form of a module, a procedure, a function, etc. which perform function or operations according to the present invention. Firmware or software configured to implement the present invention may be included in the processors 155 and 180 or stored in the memories 160 and 185 and driven by the processors 155 and 180.

Layers of a wireless interface protocol between wireless communication systems (network) of the UE and the BS may be classified into a first layer L1, a second layer L2, and a third layer L3 based on three lower layers of an open system interconnection (OSI) model that is well known in a communication system. A physical layer belongs to the first layer L1 and provides an information transfer service through a physical channel. A radio resource control (RRC) layer belongs to the third layer (L3) and provides control radio resources between the UE and a network. The UE and the BS may exchange RRC messages through a wireless communication network and an RRC layer.

Throughout this specification, the processor 155 of the UE 110 and the processor 180 of the BS 105 perform an operation for processing signals and data except for a function of receiving or transmitting signals by the UE 110 and the BS 105 or a storing function. However, hereinafter, for convenience of description, the processors 155 and 180 will not be specially stated. Unless the processors 155 and 180 are not stated, a series of operations such as data processing but not the function of transmitting or receiving signals and the storing function may be performed.

In general, a link between existing multiples radio access technologies (RATs) or multiple systems (for example, long term evolution (LTE) and Wi-Fi systems) have focused on supporting mobility in terms of access to a network and authentication. However, there has recently been a discussion about receiving a general Internet data service through a public network using Wi-Fi and receiving a quality of service (QoS) support or a service of a radio operator through an LTE core network in terms of managing networks of mobile carriers. To achieve this, research into a concept of transmitting and receiving data simultaneously through the LTE network and the Wi-Fi network has been conducted.

Figure 2:
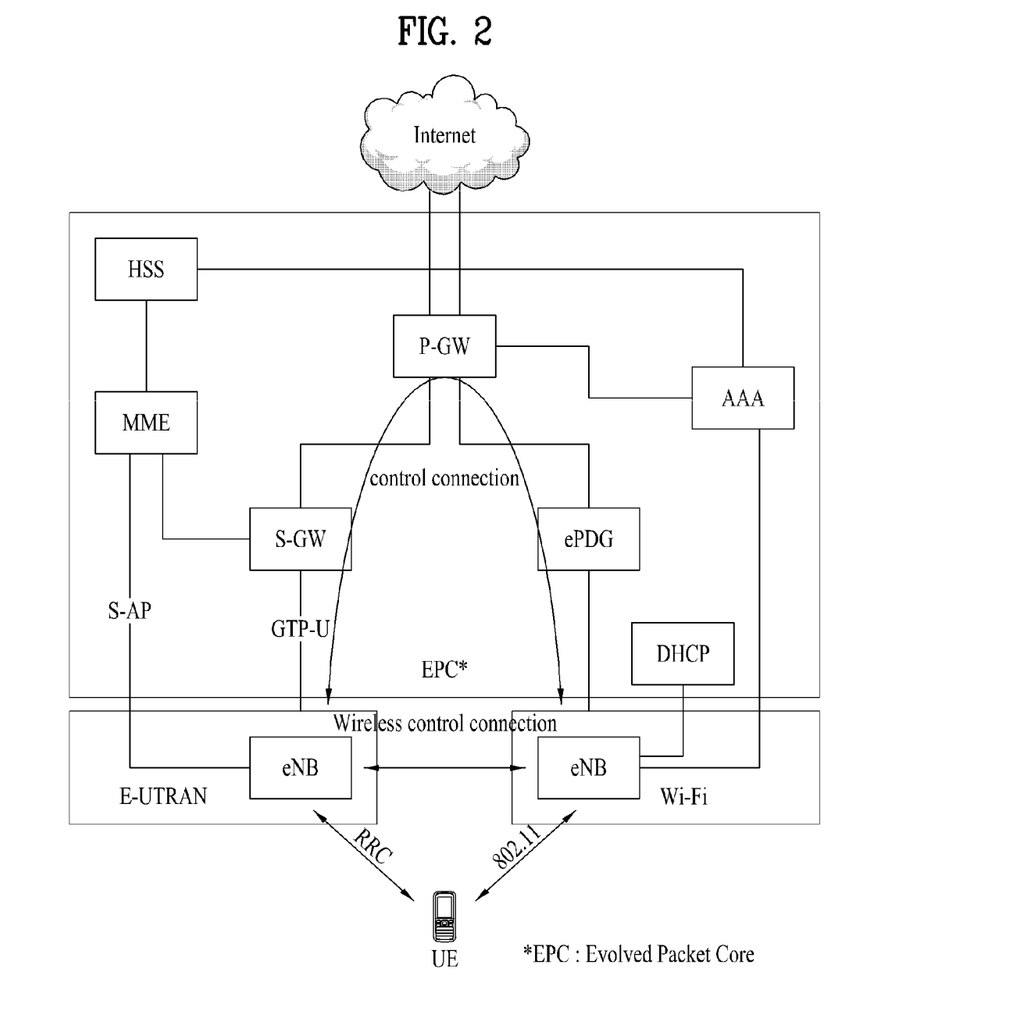
FIG. 2 is a block diagram illustrating a network structure for describing a linkage structure of a first communication system (for example, an LTE system) and a second communication system (for example, a Wi-Fi system).

FIG. 2 illustrates a network structure for describing a linkage structure of a first communication system (for example, an LTE system) and a second communication system (for example, a Wi-Fi system).

In the network structure illustrated in FIG. 2, backhaul control connection or wireless control connection may be present between an AP and an eNB through a backbone network (for example, a P-GW or evolved packet core (EPC)). To achieve peak throughput and data traffic offloading, a UE may support both the first communication system (or first communication RAT) that uses a first radio communication scheme and the second communication system (or second communication RAT) that uses a second radio communication scheme through a link between a plurality of communication networks. Here, the first communication RAT or the first communication system may be referred to as a primary RAT or a primary system, respectively, and the second communication RAT or the second communication system may be referred to as a secondary RAT or a secondary system, respectively. For example, the UE may be configured to support the LTE (or LTE-A) system and the Wi-Fi system (a local area communication system such as WLAN/802.11) at the same time.

In the network structure illustrated in FIG. 2, the primary system has a wider coverage area, and may correspond to a network for transmission of control information. Examples of the primary system include WiMAX or LTE. On the other hand, the secondary system may correspond to a network having a small coverage area and a system for data transmission. Examples of the secondary network include a wireless local area network (WLAN) system such as Wi-Fi.

Introduction of a concept of simultaneously transmitting and receiving data through the LTE network and the Wi-Fi network entails a need for integrated state management. To this end, research into multi-radio power management has been conducted. Power consumption, control of an idle/sleep mode, and the like in an integrated manner may allow high power efficiency.

On the other hand, in a conventional technology, the LTE system is at least in the idle mode during Wi-Fi communication. However, LTE connection is not needed during Wi-Fi connection in an integrated network. Therefore, the present invention proposes a method of controlling the idle mode through location management when the UE is connected only to the Wi-Fi network. In particular, the present invention proposes a method of receiving a paging message of the LTE system when the UE is connected only to the Wi-Fi network and a location update scheme therefor.

As described in the foregoing, integrated state control is needed in a case of a link between multiple RATs. Since multiple carriers are introduced, LTE may be used as the primary RAT, and Wi-Fi, a device to device (D2D) communication scheme, or the like may be used as the secondary RAT. The secondary RAT (for example, Wi-Fi) and the like are managed in LTE.

A multi-RAT state machine will be described.

A UE in the LTE network is in one of three states such as a turn-off (TO) state, an idle (IDL) state, and an active (A) state. A UE in the Wi-Fi network is in one of three states such as the turn-off (TO) state, a sleep (SLP) state, and the active (A) state. Combined states of the multiple RATs may be configured by integrally managing connection states which have been separately operated. For example, a UE may be indicated by (LTE network state, Wi-Fi network state), for example, (TO, TO), (IDL, TO), (IDL, SLP), (TO, SLP), . . . , (A, A).

A network registration state may also be integrally managed in an EPS Mobility Management (EMM) state. EMM_Connected is a mobile management entity (MME)-registered state (idle, active). In addition, MEMM_Connected is a newly proposed state. The MEMM_Connected state is a network-registered state in any one of the RATs and excludes (TO, TO) state.

MEMM_Connected State

This state is a state of being EMM-attached to an MME corresponding to an overlay BS of an AP in a case of Wi-Fi only. As a solution, a virtual base station may be included in a network and linked to the AP so that the MME may perform paging operation to the virtual base station. Integrated management includes authentication, paging, IP management, and the like.

Figure 3:
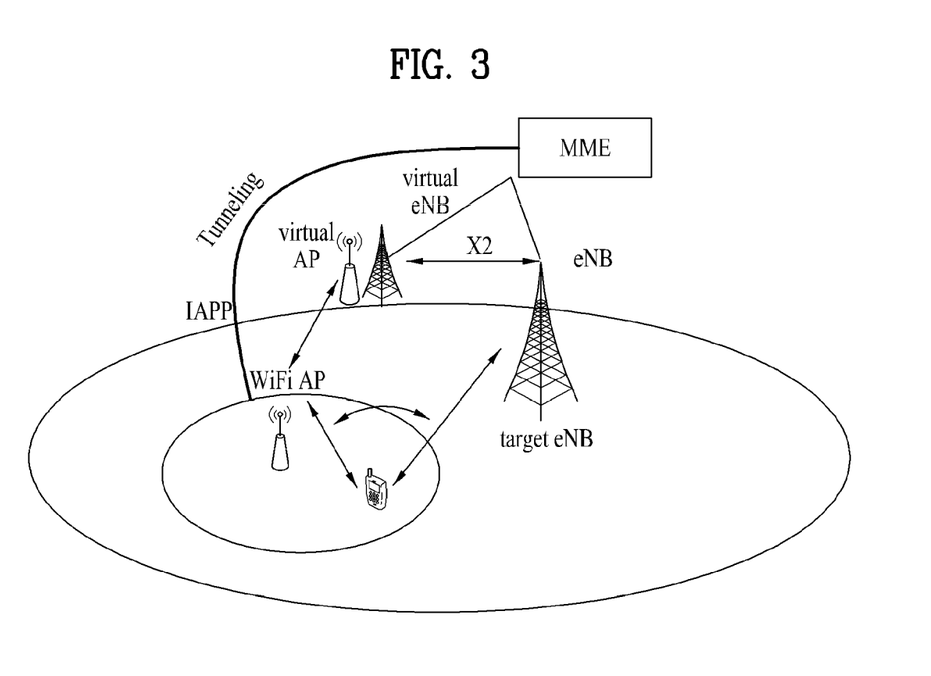
FIG. 3 is a diagram illustrating a scheme of supporting mobility related to a multi-radio (multi-RAT) power management issue.

FIG. 3 illustrates a scheme of supporting mobility related to a multi-radio (multi-RAT) power management issue.

An analogous art of the WiMAX forum may be changed and used to support mobility (for example, a virtual AP and a virtual eNB (VeNB)). In the WiMAX forum, Wi-Fi signal forward function (SFF) or WiMAX SFF performs functions of the virtual AP and the VeNB.

In FIG. 3, it is presumed that a VeNB connected to a Wi-Fi AP has information about an overlay eNB. As illustrated in FIG. 3, in a case of handover from the LTE network to the Wi-Fi network, a UE may access a virtual AP in the network (re-association), and perform Wi-Fi handover to a target AP via the virtual AP using the inter-access point protocol (IAPP).

On the other hand, in a case of handover from the Wi-Fi network to the LTE network, the UE may be registered in the VeNB in the network (that is, registered through an RRC connection establishment procedure), and perform handover from the VeNB to the target eNB. Paging may be provided in a similar manner. The UE receives a paging message through an AP of the Wi-Fi network, is registered in the VeNB, and is handed over to an actual eNB.

Integrated EMM State

Multi-Radio Enhanced Mobility Management (MEMM)

EMM_connected state refers to a state in which a UE is registered in an MME. Previously, EMM registration cannot be performed when accessing Wi-Fi only. When Wi-Fi is installed by an operator, integrated location management may be performed through Wi-Fi.

As a solution for this, an L3 tunnel is established between the VeNB and the UE during access through a Wi-Fi AP to logically enable location registration through virtual BS. A point of this proposal is a scheme of including the VeNB in the network to support mobility through the VeNB. In particular, a scheme of registering the UE in the MME through the VeNB is a technology excluded from an existing the WiMAX forum scheme. The VeNB does not have a wireless (radio) function and provides a function of connection to the MME or another eNB.

For idle mode mobility enhancement, there are three main operations for the UE in the idle mode, and the three operations in the idle mode are as below.

1. Termination of the idle mode by the UE (network entry/reentry)
2. Receiving of a paging message
3. Registration of a location (update of a tracking area)

Figure 4:
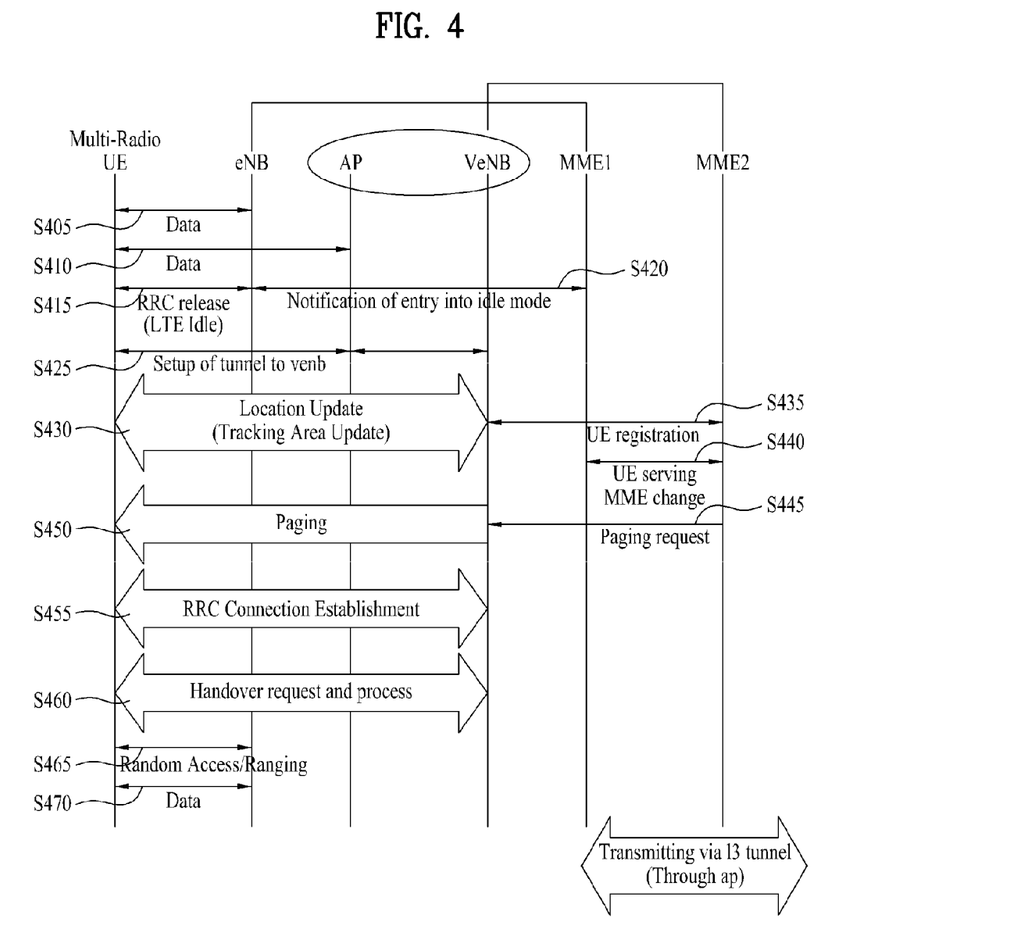
FIG. 4 is a diagram illustrating the scheme of supporting mobility related to the multi-radio (multi-RAT) power management issue.

FIG. 4 is related to a scheme of efficiently supporting idle mode mobility enhancement, in particular, location registration (tracking area update). Tracking area update is used for two purposes. A primary purpose of tracking area update is to manage routing path in mobile IP-based transmission. A second purpose is to actually manage a location of the UE in the network. When a tracking area is changed, the UE reports the change to the MME using a non-access spectrum message. The network may recognize a tracking area in which the UE is present based on the report.

FIG. 4 illustrates the scheme of supporting mobility related to the multi-radio (multi-RAT) power management issue.

Referring to FIG. 4, a multi-radio UE may exchange data with an eNB in the LTE network in S405, and exchange data with an AP in the Wi-Fi network simultaneously or at another time in S410. Thereafter, the multi-radio UE may enter the idle mode by releasing RRC from the LTE network to exchange data only via the Wi-Fi network in S415. The eNB performing operation of releasing RRC with the multi-radio UE may inform MME1 that the multi-radio UE enters the idle mode in S420. Thereafter, the multi-radio UE establishes a tunnel to a VeNB through the AP in S425. The L3 tunnel is established between the VeNB and the UE while the multi-radio UE performs access through a Wi-Fi AP, which logically enables location registration through the VeNB.

Thereafter, the multi-radio UE performs location update with the VeNB in S430. Through location update with the VeNB, the VeNB delivers an updated location of the multi-radio UE to MME2 in S435. MME2 determines whether to change a serving MME of the multi-radio UE based on the updated location of the multi-radio UE, and requests MME1 to change the serving MME of the multi-radio UE when, for example, the serving MME needs to be changed from MME2 to MME1 in S440. Thereafter, MME2 requests that the VeNB perform paging in S445.

Thereafter, the VeNB transmits a paging message to the multi-radio UE in S450. The multi-radio UE receiving the paging message from the VeNB performs an RRC connection establishment operation with the VeNB in S455. In addition, the multi-radio UE performs a handover operation such as handover request while being RRC-connected to the VeNB in S460. The multi-radio UE may exchange a random access/ranging message in S465 and data in S470 with the eNB.

As described above with regard to FIG. 4, while the multi-radio UE is performing access through Wi-Fi AP, the L3 tunnel is established between the VeNB and the UE to logically enable location registration through the VeNB. Here, a scheme of transmitting data (scheme of establishing the L3 tunnel) to the VeNB is examined.

The WiMAX forum uses Media Independent Handover Function (MIHF) of IEEE 802.21 or a scheme in which a server in the network automatically performs setting.

The present invention proposes the following scheme. First, 1) a super-ordinate eNB informs the multi-radio UE of an IP address of a VeNB in advance. Subsequently, 2) the multi-radio UE may acquire this information from an eNB camped on at the end. In this case, the IP address of the VeNB may be received through standard change, or reported by the server in the network. 3) When the UE may perform Wi-Fi offloading without a request from the multi-radio UE, the IP address of the VeNB may be reported to the multi-radio UE in advance. When the IP address of the VeNB is absent, the IP address may be periodically updated.

A scheme of updating information about the IP address of the VeNB will be described with reference to FIG. 5.

Figure 5:
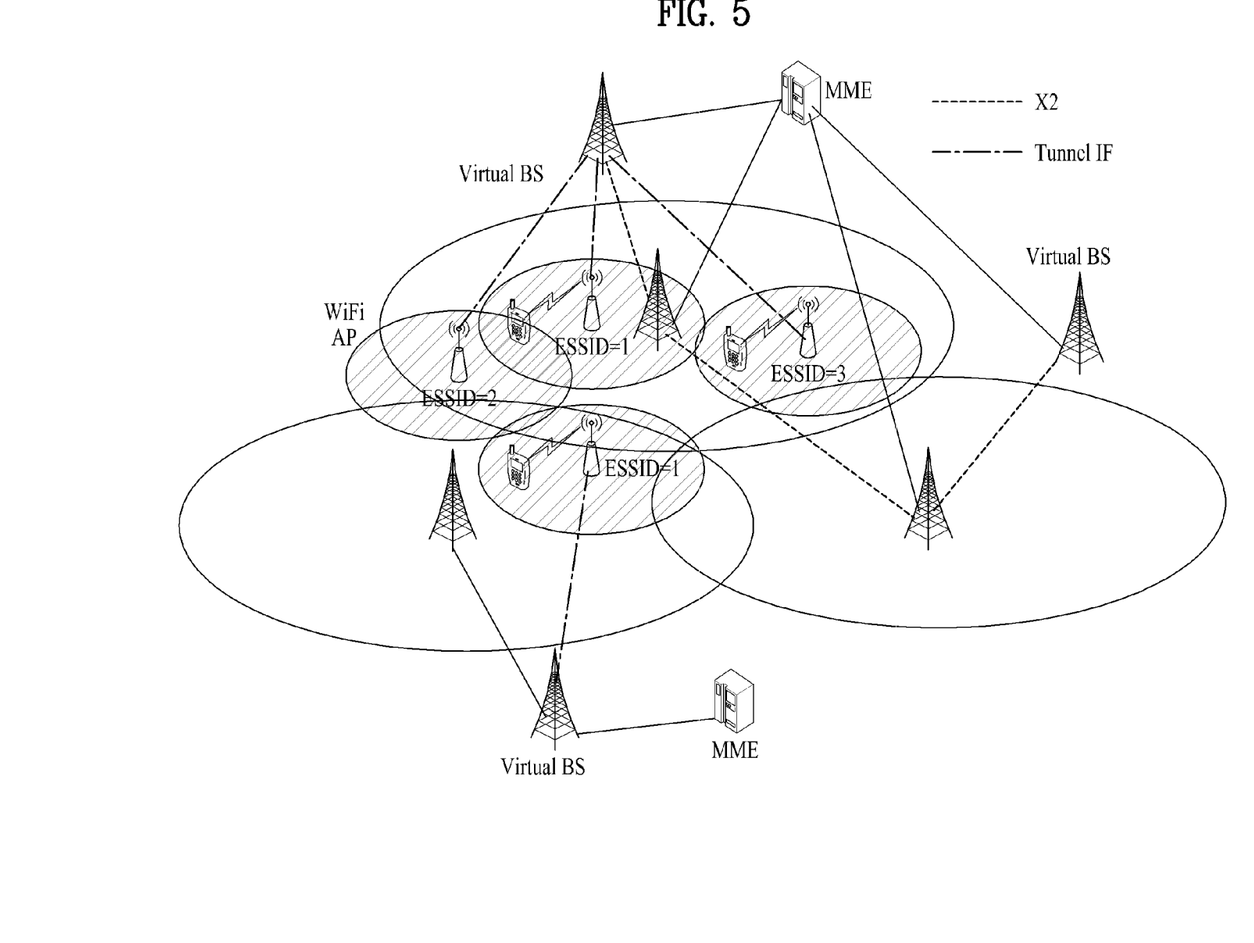
FIG. 5 is a diagram illustrating a scheme of updating an Internet protocol (IP) address of a virtual eNB.

FIG. 5 illustrates a scheme of updating the IP address of the VeNB.

Referring to FIG. 5, an extended service set (ESS) of a Wi-Fi AP may share MAC information. The ESS is a set of APs and thus may be assumed to be in the same VeNB. When the multi-radio UE moves to another AP having a different ESSID, the IP address of the VeNB is updated.

As a first update scheme, the multi-radio UE searches for an eNB. When changing an ESSID, the multi-radio UE searches for an actual eNB and performs update. As a second update scheme, a location is updated through an existing VeNB. The VeNB requests that the UE perform handover when changing an AP, handover establishes the L3 tunnel to a new VeNB, and the new VeNB registers the UE in an upper-layer MME of the new VeNB. In this way, the UE may update an address of the VeNB.

The aforementioned embodiments are achieved by a combination of structural elements and features of the present invention in a predetermined manner. Each of the structural elements or features should be considered selectively unless otherwise specified. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. It will be apparent that some claims not explicitly referring to one another may be combined to constitute an embodiment or to be included as a new claim by means of amendment after the application is filed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The method for updating a location by a UE that supports a plurality of radio access technologies is industrially applicable to various communication systems such as 3GPP LTE, LTE-A. IEEE 802, and the like.

The invention claimed is:

1. A method for updating a location by a user equipment (UE) supporting a plurality of radio access technologies, the method comprising:
   receiving an internet protocol (IP) address of a virtual base station of a Long term evolution (LTE) network from a base station of the LTE network when a handover is determined from the LTE network to a Wi-Fi network, the virtual base station connected to the base station of the Wi-Fi network;
   releasing a radio resource connection with a-the base station of the LTE network;
   accessing the base station of the Wi-Fi network using a second radio access technology, the UE being capable of simultaneously accessing different networks using a first radio access technology and the second radio access technology;
   establishing a layer 3 (L3) tunnel with the virtual base station via the base station of the Wi-Fi network using the received IP address;
   receiving a paging message from the virtual base station;
   establishing a radio resource connection with the virtual base station according to the paging message; and
   transmitting an updated location of the UE to the virtual base station in order to register the updated location of the UE in a mobile management entity (MME) via the virtual base station.

2. The method according to claim 1, further comprising:
   receiving, from the virtual base station of the LTE network, a message for handover request to perform the handover to the base station of the Wi-Fi network when the base station of the Wi-Fi network is needed to perform the handover due to movement of the UE;
   performing the handover according to the handover request; and
   establishing the L3 tunnel with another virtual base station of the LTE network.

3. The method according to claim 2, wherein the base station of the Wi-Fi network is needed to perform the handover when the UE is located in an area of another base station of the Wi-Fi network and is establishing a tunnel to the another virtual base station due to the movement of the UE.

4. A user equipment (UE) updating its location, the UE comprising:
   a processor configured to:
   receive an internet protocol (IP) address of a virtual base station of a long term evolution (LTE) network from a base station of the LTE network when a handover is determined from the LTE network to a Wi-Fi network, the virtual base station connected to the base station of the Wi-Fi network;

release a radio resource connection with the base station of the LTE network;
access the base station of the Wi-Fi network using a second radio access technology, the UE being capable of simultaneously accessing different networks using a first radio access technology and the second radio access technology; and
establish a layer 3 (L3) tunnel with the virtual base station via the base station of the Wi-Fi network using the received IP address; a receiver for receiving messages wherein the processor is further configured to; control the receiver to receive a paging message from the virtual base station; and establish a radio resource connection with the virtual base station according to the paging message; and
a transmitter configured to transmit an updated location of the UE to the virtual base station in order to register the updated location of the UE in a mobile management entity (MME) via the virtual base station to.

5. The UE according to claim 4, wherein the processor is further configured to:
control the receiver to receive, from the virtual base station of the LTE network, a message for handover request to perform the handover to the base station of the Wi-Fi network when the base station of the Wi-Fi network is needed to perform the handover due to movement of the UE;
perform the handover according to the handover request; and
establish the L3 tunnel to another virtual base station of the LTE network.

6. The UE according to claim 5, wherein the base station of the Wi-Fi network is needed to perform the handover when the UE is located in an area of another base station of the Wi-Fi network and is establishing a tunnel to the another virtual base station due to the movement of the UE.

* * * * *